(12) United States Patent
Haramaty et al.

(10) Patent No.: US 9,584,429 B2
(45) Date of Patent: Feb. 28, 2017

(54) CREDIT BASED FLOW CONTROL FOR LONG-HAUL LINKS

(71) Applicant: Mellanox Technologies Ltd., Yokneam (IL)

(72) Inventors: Zachy Haramaty, Hemed (IL); Roy Kriss, Netanya (IL); Noam Katz Abramovich, Tel Aviv (IL); George Elias, Tel Aviv (IL); Ran Ravid, Tel Aviv (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 339 days.

(21) Appl. No.: 14/335,962

(22) Filed: Jul. 21, 2014

(65) Prior Publication Data

US 2016/0021016 A1    Jan. 21, 2016

(51) Int. Cl.
*H04L 12/801* (2013.01)
*H04L 12/807* (2013.01)
*H04L 12/863* (2013.01)
*H04L 12/825* (2013.01)
*H04L 12/835* (2013.01)

(52) U.S. Cl.
CPC ............ *H04L 47/39* (2013.01); *H04L 47/263* (2013.01); *H04L 47/30* (2013.01)

(58) Field of Classification Search
CPC ....... H04L 47/10; H04L 47/12; H04L 47/263; H04L 47/30; H04L 47/39; H04L 47/527; H04L 47/62; H04L 47/27; H04L 12/417; H04L 47/215
See application file for complete search history.

(56) References Cited

U.S. PATENT DOCUMENTS

| 5,235,642 | A  | 8/1993  | Wobber et al.  |
|-----------|----|---------|----------------|
| 5,367,520 | A  | 11/1994 | Cordell        |
| 5,574,885 | A  | 11/1996 | Denzel et al.  |
| 5,790,522 | A  | 8/1998  | Fichou et al.  |
| 5,917,947 | A  | 6/1999  | Ishida et al.  |
| 6,160,814 | A  | 12/2000 | Ren et al.     |
| 6,169,748 | B1 | 1/2001  | Barbas et al.  |
| 6,324,165 | B1 | 11/2001 | Fan et al.     |

(Continued)

FOREIGN PATENT DOCUMENTS

| EP | 1698976 A1  | 9/2006 |
|----|-------------|--------|
| WO | 03024033 A1 | 3/2003 |

OTHER PUBLICATIONS

U.S. Appl. No. 14/207,680 Office Action dated Sep. 25, 2015.

(Continued)

*Primary Examiner* — Hoang-Chuong Vu
(74) *Attorney, Agent, or Firm* — D. Kligler IP Services Ltd.

(57) ABSTRACT

A method for communication includes storing packets received from a sending node over a communication link in a receive buffer of a receiving node. The receive buffer includes one or more blocks having a first block size. A first credit count, corresponding to a number of available blocks in the receive buffer, is derived. The first credit count is converted to a second credit count so as to represent an available space in the receive buffer in accordance with a second block size, which is different from the first block size. A transmission rate of the sending node is controlled by publishing the second credit count to the sending node over the communication link.

12 Claims, 3 Drawing Sheets

(56) References Cited

U.S. PATENT DOCUMENTS

| | | |
|---|---|---|
| 6,347,337 B1 | 2/2002 | Shah et al. |
| 6,456,590 B1 | 9/2002 | Ren et al. |
| 6,490,248 B1 | 12/2002 | Shimojo |
| 6,535,963 B1 | 3/2003 | Rivers |
| 6,539,024 B1 | 3/2003 | Janoska et al. |
| 6,606,666 B1 | 8/2003 | Bell et al. |
| 6,633,395 B1 | 10/2003 | Tuchitoi et al. |
| 6,771,654 B1 | 8/2004 | Sang et al. |
| 6,895,015 B1 | 5/2005 | Chiang et al. |
| 6,922,408 B2 | 7/2005 | Bloch et al. |
| 6,993,032 B1 | 1/2006 | Dammann et al. |
| 7,027,457 B1 | 4/2006 | Chiussi et al. |
| 7,068,822 B2 | 6/2006 | Scott |
| 7,088,713 B2 | 8/2006 | Battle et al. |
| 7,131,125 B2 | 10/2006 | Modelski et al. |
| 7,136,381 B2 | 11/2006 | Battle et al. |
| 7,190,667 B2 | 3/2007 | Susnow et al. |
| 7,327,749 B1 | 2/2008 | Mott |
| 7,334,065 B1 | 2/2008 | Rose et al. |
| 7,590,058 B1 | 9/2009 | Cherchali et al. |
| 7,609,636 B1 | 10/2009 | Mott |
| 7,747,086 B1 | 6/2010 | Hobbs et al. |
| 7,773,622 B2 | 8/2010 | Schmidt et al. |
| 7,853,738 B2 | 12/2010 | Pothireddy et al. |
| 7,856,026 B1 | 12/2010 | Finan et al. |
| 7,924,708 B2 | 4/2011 | Spink |
| 7,936,770 B1 | 5/2011 | Frattura et al. |
| 8,149,710 B2 | 4/2012 | Bergamasco et al. |
| 8,270,295 B2 | 9/2012 | Kendall et al. |
| 8,274,971 B2 | 9/2012 | Battle et al. |
| 8,352,648 B1 | 1/2013 | Puranik |
| 8,478,811 B2 | 7/2013 | Garg et al. |
| 8,635,386 B2 | 1/2014 | Takahashi |
| 8,656,188 B2 | 2/2014 | Goodwill et al. |
| 8,699,491 B2 | 4/2014 | Koren et al. |
| 8,923,337 B2 | 12/2014 | Singh |
| 2002/0012340 A1 | 1/2002 | Kalkunte et al. |
| 2002/0019916 A1 | 2/2002 | Henrion |
| 2002/0027908 A1 | 3/2002 | Kalkunte et al. |
| 2002/0067695 A1 | 6/2002 | Skarpness et al. |
| 2002/0176432 A1 | 11/2002 | Courtney et al. |
| 2003/0016697 A1 | 1/2003 | Jordan |
| 2003/0043828 A1 | 3/2003 | Wang et al. |
| 2003/0048792 A1 | 3/2003 | Xu et al. |
| 2003/0076849 A1 | 4/2003 | Morgan et al. |
| 2003/0095560 A1 | 5/2003 | Arita et al. |
| 2003/0117958 A1 | 6/2003 | Nation et al. |
| 2003/0118016 A1 | 6/2003 | Kalkunte et al. |
| 2003/0120894 A1 | 6/2003 | Wang et al. |
| 2003/0123392 A1 | 7/2003 | Ruutu et al. |
| 2003/0137939 A1 | 7/2003 | Dunning et al. |
| 2003/0198231 A1 | 10/2003 | Kalkunte et al. |
| 2003/0198241 A1 | 10/2003 | Putcha et al. |
| 2003/0200330 A1 | 10/2003 | Oelke et al. |
| 2003/0222860 A1 | 12/2003 | Yamaura |
| 2003/0223435 A1 | 12/2003 | Gil |
| 2004/0027989 A1* | 2/2004 | Martin ............... H04L 47/10 370/229 |
| 2004/0037558 A1 | 2/2004 | Beshasi |
| 2004/0066785 A1 | 4/2004 | He et al. |
| 2004/0202169 A1 | 10/2004 | Mukouyama et al. |
| 2005/0063370 A1 | 3/2005 | Beshai et al. |
| 2005/0076138 A1 | 4/2005 | Sterne |
| 2005/0125424 A1 | 6/2005 | Herriott et al. |
| 2005/0129033 A1 | 6/2005 | Gordy et al. |
| 2005/0135356 A1 | 6/2005 | Muthukrishnan et al. |
| 2005/0223139 A1* | 10/2005 | Wagh ............... G06F 13/4059 710/52 |
| 2005/0259574 A1 | 11/2005 | Figueira et al. |
| 2006/0034172 A1 | 2/2006 | Morton |
| 2006/0092842 A1 | 5/2006 | Beukema et al. |
| 2006/0095609 A1 | 5/2006 | Radhakrishnan et al. |
| 2006/0155938 A1 | 7/2006 | Cummings et al. |
| 2006/0182112 A1 | 8/2006 | Battle et al. |
| 2007/0015525 A1 | 1/2007 | Beming et al. |
| 2007/0019553 A1 | 1/2007 | Sagfors et al. |
| 2007/0025242 A1 | 2/2007 | Tsang |
| 2007/0053350 A1 | 3/2007 | Spink et al. |
| 2007/0274215 A1 | 11/2007 | Gusat et al. |
| 2008/0144670 A1* | 6/2008 | Goossens ............... G06F 15/78 370/503 |
| 2008/0259936 A1 | 10/2008 | Hussain et al. |
| 2009/0003212 A1 | 1/2009 | Kwan et al. |
| 2009/0010162 A1 | 1/2009 | Bergamasco et al. |
| 2009/0161684 A1 | 6/2009 | Voruganti et al. |
| 2009/0182944 A1 | 7/2009 | Comparan et al. |
| 2010/0057953 A1 | 3/2010 | Kim et al. |
| 2010/0088756 A1 | 4/2010 | Balakrishnan et al. |
| 2010/0100670 A1 | 4/2010 | Jeddeloh |
| 2010/0165842 A1* | 7/2010 | Wang ............... G06F 13/385 370/235 |
| 2010/0325318 A1 | 12/2010 | Desoli et al. |
| 2011/0058571 A1 | 3/2011 | Bloch et al. |
| 2012/0072635 A1 | 3/2012 | Yoshida et al. |
| 2012/0106562 A1 | 5/2012 | Laor et al. |
| 2012/0144064 A1 | 6/2012 | Parker et al. |
| 2013/0212296 A1 | 8/2013 | Goel et al. |
| 2014/0036930 A1 | 2/2014 | Lih et al. |
| 2014/0095745 A1 | 4/2014 | Kawahara |
| 2014/0140206 A1* | 5/2014 | Hendel ............... H04L 47/36 370/229 |
| 2014/0155043 A1* | 6/2014 | Gell ............... H04W 4/003 455/414.1 |
| 2014/0204742 A1 | 7/2014 | Pandit |
| 2014/0269711 A1 | 9/2014 | Ravid et al. |
| 2014/0286349 A1 | 9/2014 | Kitada |
| 2014/0289568 A1 | 9/2014 | Koyoma et al. |
| 2014/0310354 A1 | 10/2014 | Fountain et al. |
| 2015/0026309 A1 | 1/2015 | Radcliffe et al. |
| 2015/0058857 A1 | 2/2015 | Sandstorm |
| 2015/0103667 A1 | 4/2015 | Elias |
| 2015/0180790 A1* | 6/2015 | Rimmer ............... H04L 47/39 370/368 |
| 2016/0226951 A1* | 8/2016 | Talpey ............... H04L 47/39 |

OTHER PUBLICATIONS

U.S. Appl. No. 14/813,142 Office Action dated Nov. 5, 2015.
U.S. Appl. No. 12/876,265 Office Action dated May 1, 2013.
Raatikainen, P., "ATM Switches—Switching Technology S38. 3165", Switching Technology, L8-1, 34 pages, year 2006 (http://www.netlab.hut.fi/opetus/s383165).
Fahmy, S., "A Survey of ATM Switching Techniques", Department of Computer and Information Science, The Ohio State University, USA, 22 pages, Aug. 21, 1995 (http://www.cs.purdue.edu/homes/fahmy/cis788.08Q/atmswitch.html).
U.S. Appl. No. 13/189,593 Office Action dated Jul. 9, 2013.
Minkenberg et al., "Multistage Interconnection Networks for Data Centers; Bidirectional Fat Tree Construction and Routing for IEEE 802.1au", IBM Research GmbH, Zurich, Switzerland, 9 pages, Jul. 2, 2007.
Infiniband Architecture Release 1.2.1, vol. 1, General specifications, Chapter 7.9, pp. 212-216, Nov. 2007.
Haramaty et al, U.S. Appl. No. 14/207,680 dated Mar. 13, 2014.
U.S. Appl. No. 14/813,142 Office Action dated Jul. 19, 2016.

* cited by examiner

CREDIT BASED FLOW CONTROL FOR LONG-HAUL LINKS

FIELD OF THE INVENTION

The present invention relates generally to communication networks, and particularly to methods and systems for managing flow control for long-haul links.

BACKGROUND OF THE INVENTION

Various communication networks use a flow control mechanism to allow a receiver node to control the traffic sending rate of a sender node. Different flow control methods are known in the art. For example, flow control in InfiniBand (IB) communication networks is specified in chapter 7.9 of the IB specifications, titled "InfiniBand™ Architecture Specification," Volume 1, Release 1.2.1, November, 2007, which is incorporated herein by reference.

For example, U.S. Pat. No. 6,347,337, whose disclosure is incorporated herein by reference, describes a credit-based flow control scheme that is designed to operate over Virtual Interface (VI) Architecture. The credit-based flow control scheme reduces overhead (e.g., reduces buffer copies and kernel processing) by relying upon the reliability properties of the underlying VI Architecture. If the number of send credits is sufficient, the sender prepares and sends the packet. Otherwise, the sender sends a Credit Request and waits for a Credit Response. Upon receiving the corresponding Credit Response, the sender continues sending data packets. In response to a sender's Credit Request, the receiver sends the Credit Response only when it has enough receive credits.

As another example, U.S. Pat. No. 7,190,667, whose disclosure is incorporated herein by reference, describes some embodiments that include a data network comprising a host system having a host-fabric adapter, at least one remote system, a switch fabric which interconnects the host system via the host-fabric adapter to the remote system along different physical links for data communications, and at least one communication port provided in the host-fabric adapter of the host system. The communication port includes a set of transmit and receive buffers capable of sending and receiving data packets concurrently via respective transmitter and receiver at the end of a physical link, via the switched fabric. The communication port additionally comprises a flow control mechanism utilized to prevent loss of data due to receive buffer overflow at the end of the physical link.

U.S. Patent Application Publication 2006/0092842, whose disclosure is incorporated herein by reference, describes a module, and a system for calculating a credit limit for an interface of a second device, that is capable of receiving multiple packets simultaneously from a first device. Generally, the multiple packets are simultaneously received at an interface on the second device, each packet being one of a plurality of packet types, and a flow control credit limit to be transmitted to the first device is adjusted based on the combination of packet types of the simultaneously received packets.

SUMMARY OF THE INVENTION

An embodiment of the present invention that is described herein provides a method for communication, including storing packets received from a sending node over a communication link in a receive buffer of a receiving node. The receive buffer includes one or more blocks having a first block size. A first credit count, corresponding to a number of available blocks in the receive buffer, is derived. The first credit count is converted to a second credit count so as to represent an available space in the receive buffer in accordance with a second block size, which is different from the first block size. A transmission rate of the sending node is controlled by publishing the second credit count to the sending node over the communication link.

In some embodiments, publishing the second credit count includes publishing a number of bytes that is smaller than an actual size of the receive buffer by at least the second block size. In other embodiments, a ratio between the second block size and the first block size equals an integer ratio, and converting the first credit count includes extracting from the first credit count a number of Most Significant Bits (MSBs), which depends on the integer ratio. In an embodiment, the method further includes rounding-up or rounding-down the extracted MSBs.

In an embodiment, the method includes maintaining in the sending node a credit count in accordance with the first block size, and updating the credit count based on the second credit count published by the receiving node and on a number of bytes delivered from the sending node over the communication link. In another embodiment, the method includes maintaining in the sending node a sent blocks count indicating a number of blocks delivered to the communication link since link initialization, and reporting by the sending node to the receiving node the sent blocks count in units corresponding to the second block size. In yet another embodiment, deriving the first credit count includes evaluating the number of available blocks in the receive buffer excluding part of the available space whose size equals at least the second block size.

There is additionally provided, in accordance with an embodiment of the present invention, a communication apparatus including a receive buffer, which includes one or more blocks having a first block size, and a receiver controller. The receiver controller is configured to store packets received over a communication link in the receive buffer, to derive a first credit count corresponding to a number of available blocks in the receive buffer, to convert the first credit count to a second credit count so as to represent an available space in the receive buffer in accordance with a second block size, which is different from the first block size, and to control a transmission rate of the packets by publishing the second credit count over the communication link.

The present invention will be more fully understood from the following detailed description of the embodiments thereof, taken together with the drawings in which:

DETAILED DESCRIPTION OF EMBODIMENTS

Overview

In some communication networks, various network nodes such as computing nodes or network elements communicate with one another by sending signals (e.g., electrical or optical signals) over network links that interconnect among the nodes. The signals may comprise data and control traffic, including flow-control information. A network link typically connects between respective ports of the sending and receiving nodes.

A port receiving traffic over the network typically comprises a receive buffer to temporarily store incoming data. As will be explained below, since propagation delay of signals depends on the length of the network link, the size of the receive buffer should be typically larger for longer links. A port comprising a receive buffer of a given size can support link lengths that are constrained by the given receive buffer size and by the transmission data rate over the link.

Embodiments of the present invention that are described herein provide improved methods and systems for credit-based flow control in network nodes that communicate over long-haul links. In some embodiments, the rate of data transmission at the sending end is controlled so as not to overfill the receive buffer at the receiving end. For example, in lossless flow control, such as credit-based flow control, the receiving end or next-hop switch signals to the sending end the amount of free space available in its receive buffer.

The propagation delay of communication signals along a given link is proportional to the length of the link. For example, the two-way propagation time, or Round Trip Time (RTT), is given by $RTT=2 \cdot L/V$, wherein L denotes the link length (e.g., in meters) and V denotes the propagation speed of signals along the link (e.g., in meters per second). As an example, the RTT along a 1 Km optical fiber cable, in which light signals travel at a speed of about $2 \cdot 10^8$ meters per second, is about 10 microseconds.

Let BSIZE denote the size of the receive buffer at the receiving end (e.g., given in bits). With credit-based flow control, to fully exploit the bandwidth of the link, BSIZE should exceed $RTT \cdot BR$ bits, wherein BR denotes the data rate over the link (in bits per seconds). Note that the required buffer size is proportional to the RTT of the link, and therefore also to the length of the link. Using the expression for the RTT above, the buffer size constraint for a link of length L delivering data at a rate BR, i.e., without bandwidth penalty, can be written as $BSIZE > 2 \cdot L \cdot BR/V$.

The last expression can also be used for deriving a link length constraint when the size of the receive buffer is given, namely $L < BSIZE \cdot V/(2 \cdot BR)$. For example, when transmitting traffic to a receiving node comprising a 128 KB receive buffer (i.e., $BSIZE=131072 \cdot 8$ bits), over an optical fiber link at 100 G bits per second, the link length is limited to about 1.05 Km.

In some embodiments, the receive buffer that stores incoming data (e.g., data and/or control packets) at the receiving end comprises multiple buffering blocks (or simply blocks for brevity) having a constant block size, such as, for example 64 bytes per block. When a packet arrives at the receiving node, the node stores the packet in one or more available blocks of the receive buffer.

A given packet may not fit in an integer number of buffering blocks, in which case some of the space of the blocks storing the packet remains unused. In other words, any available block can store bytes that belong to only one packet. For example, assuming a block size of 64 B (64 bytes), a packet that comprises up to 64 bytes occupies one block, and a packet that comprises between 65 and 128 bytes occupies two blocks in the receive buffer. Note that in systems such as InfiniBand, in which the packet size in bytes is represented by $4 \cdot N$ for some integer N, a packet that comprises 68 to 128 bytes is stored in two blocks in the receive buffer.

Since packets may occupy a non-integer number of buffering blocks, the receive buffer may become underutilized. For example, a receive buffer comprising 2048 blocks of 64 B each can absorb up to 2048 64 B packets. The same buffer, however, can absorb only up to 1024 packets that comprise 68 B per packet, since a 68 B packet occupies two blocks, thus utilizing $68/(2 \cdot 64)$ or just over half of the buffering space. Thus, given a 128 KB receive buffer, to support the delivery of any packet size, the effective buffer size reduces to only 68 KB and the respective link length is therefore limited to about 0.5 Km in the example above (instead of the maximal 1.05 Km length for 64 B packets).

In some embodiments, the sending and receiving ends exchange flow-control packets that comprise fixed-size fields for delivering flow-control information. For example, in InfiniBand, flow-control packets comprise 12-bit fields for carrying flow-control information, as specified, for example in the IB specifications cited above.

In principle, the receiving end could publish its available buffering space to the sending end using credits of the buffering block size. In the example of a receive buffer comprising 64 B blocks, the 12-bit fields constraint limits the maximal credit count to $2^{11}=2048$, and therefore also limits the buffer size to $2048*64 \text{ B}=128 \text{ KB}$ and the respective link length to 1.05 Km.

To increase the size of the receive buffer (and therefore increase the supported link length) without extending the 12-bit flow-control fields, it is possible in principle to define larger buffering blocks. For example, using 4 KB buffering blocks rather than 64 B blocks would increase the buffering space and respective link length by a factor of $4 \text{ KB}/64 \text{ B}=64$. The main drawback of this approach, however, is that if the sending end transmits 64 B packets, each occupying a 4 KB block in the receive buffer, the receive buffer would be poorly utilized and the sending rate would decrease by a factor of $4 \text{ K}/64=64$.

In some embodiments of the present invention, the sending and receiving ends each handles flow-control information internally in units of the receive buffer block size, and communicates this flow-control information with the other end in accordance with a different block size. In one embodiment, the sending and receiving nodes each represents flow-control information internally in 18-bit resolution corresponding to a block size of 64 B. When delivering the flow-control information over the network, however, the sending and receiving nodes convert the flow-control information from 18 bits to 12 bits to fit the respective fields in the flow-control packets, and back to 18 bits at the other side of the link. Note that the 18-bit to 12-bit resolution ratio (i.e., a 64:1 ratio) equals the integer ratio between the block sizes 4 KB and 64 B.

In some embodiments, the internal 18-bit resolution flow-control information includes a credit count that specifies the available number of 64 B blocks in the receive buffer, and a received blocks count of the total number of 64 B blocks delivered since link initialization. By extending the credit count from 12 bits to 18 bits while retaining a 64 B block size, the size of the receive buffer at the receiving end and therefore also the link length can be increased by a factor of up to 64.

In some embodiments, the receiving node calculates the credit count with respect to the received blocks count. Each of the sending and receiving nodes holds an updated 18-bit resolution count of the number of 64 B blocks delivered since link initialization. To compensate for possible packet loss, the sending node occasionally informs the receiving end of the cumulative number of delivered blocks.

In an embodiment, since a single credit count in 12-bit resolution indicates to the sending end that it may send any number between 64 and 4 K bytes, the receiving end buffer includes an extra space of 4 KB, in addition to the buffering space published to the sending end.

In the disclosed techniques, the sending and receiving nodes handle flow-control information internally at high resolution, and communicate the flow-control information with one another at lower resolution. This enables the receiving node to increase the size of the receive buffer without increasing the buffer block size. As a result, the sending and receiving nodes can communicate over long-haul links and still retain high utilization of the receive buffer and high transmission rate.

System Description

Figure 1:
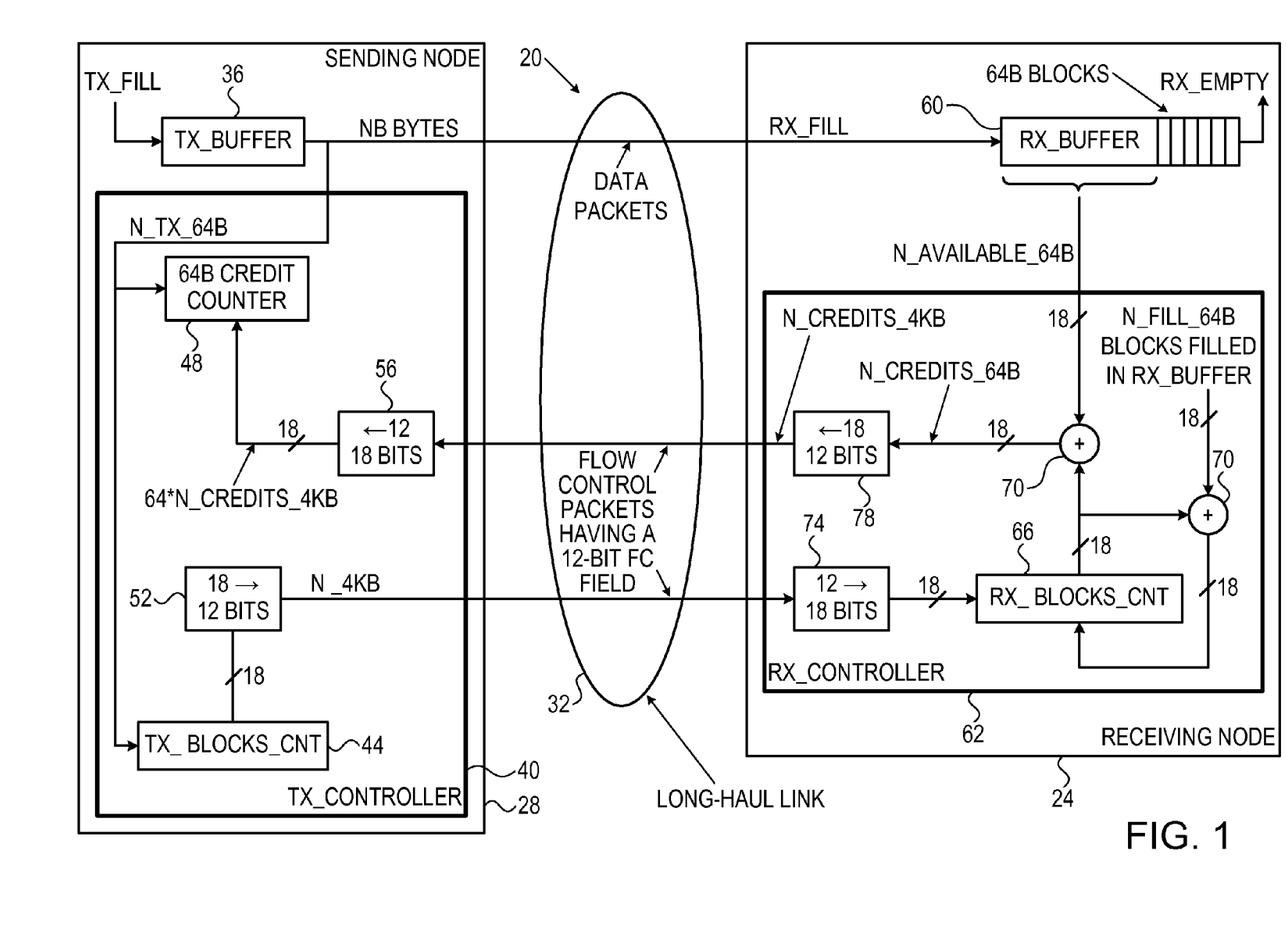
FIG. 1 is a block diagram that schematically illustrates network nodes communicating over a long-haul link using credit-based flow control, in accordance with an embodiment of the present invention.

FIG. 1 is a block diagram that schematically illustrates computing nodes communicating over a long-haul link using credit-based flow control, in accordance with an embodiment of the present invention. In FIG. 1, a communication system 20 comprises a receiving node 24, which communicates with a sending node 28 over a long haul link 32. Nodes 24 and 28 typically comprise network elements such as, for example, switches, routers, Network Interface Cards (NICs) and the like. Alternatively or additionally, nodes 24 and 28 may comprise computing nodes that communicate with one another to carry out some computing tasks, or for any other suitable purpose. FIG. 1 depicts only the elements of computing nodes 24 and 28 that are related to the disclosed techniques. Alternatively, nodes 24 and 28 may comprise or may be part of any suitable network elements that communicate over link 32.

Link 32 delivers data and flow-control traffic using any suitable communication interfaces and related protocols. For example, link 32 may be part of a network, e.g., a wide area network (WAN), a wireless network or a combination of such networks. Link 32 may be part of a packet network such as IP, InfiniBand or Ethernet network delivering information at any suitable data rate. The physical link connecting between nodes 24 and 28 can be of any suitable type and length according, for example, to the interconnection scheme within the network. For example, for lengths in the range of 1 Km-200 Km the connecting cables may comprise optical fiber cables that can deliver traffic at data rates in the range between 1 Gbps and 100 Gbps.

In the example of FIG. 1, nodes 24 and 28 exchange flow-control information (e.g., credit count information) that is represented internally using 18-bit resolution, via control packets in which flow-control information occupies 12-bit resolution fields. The 18-bit and 12-bit representations correspond to 64 B and 4 KB block size respectively. The 18-bit resolution flow-control information is converted to 12-bit resolution for sending over the network and back to 18-bit resolution at the destination.

Sending node 28 comprises a transmitter buffer 36 that stores data to be transmitted over the network, and a transmitter controller 40 that manages communication flow-control tasks of the sending node. Transmitter controller 40 comprises a sent blocks counter 44 that counts the total number of 64 B blocks sent to the network since link initialization. A partial block is considered as if a full 64 B block was sent.

Transmitter controller 40 further comprises an 18-bit credit counter 48 that holds the credit count of available 64 B blocks as published by receiving node 24. Sending node 28 is allowed to deliver to the network a number of bytes that does not exceed the available space in the receive buffer of the receiving end. In some embodiments, the number of bytes that the sending node is allowed to deliver to the network depends on the difference between credit counter 48 and sent blocks counter 44. For each block or partial block that sending node 28 delivers to the network, transmitter controller increments sent blocks counter 44 by one, and decrements credit counter 48 by one.

When sending node 28 receives a 12-bit resolution credit count via a respective flow-control packet from receiving node 24, transmitter controller 40 converts the 12-bit resolution credit count to 18-bit resolution using an up converter 56, and updates credit counter 48 accordingly. Up converter 56 can be implemented by multiplying its input by 64.

To indicate to receiving node 24 the number of sent block, transmitter controller 40 converts the value of sent blocks counter 44 to 12-bit resolution using a down converter 52, and sends the result via a suitable flow-control packet to the receiving node. Down converter 52 can be implemented, for example, by extracting the 12 Most Significant Bits (MSBs) of its 18-bit input. A detailed example for the management carried out by transmitter controller 40 is described in FIG. 3 below.

In some of the disclosed embodiments, extracting 12 MSBs out of an 18 bit quantity comprises rounding the extracted 12-bit number up. In other embodiments, extracting the 12 MSBs comprises rounding the extracted 12-bit number down. Note that the transmitter and receiver controllers should apply the same type of rounding so as to maintain matched counts in both sides.

Receiving node 24 comprises a receive buffer 60 (or simply buffer for brevity) that comprises 64 B blocks for storing incoming packets, and a receiver controller 62 that handles the communication flow-control tasks of the receiving node. Buffer 60 stores each received packet in one or more of its 64 B blocks so that each block stores the bytes of only one packet, as described above.

Receiver controller 62 comprises an 18-bit resolution received blocks counter 66 that holds the total number of 64 B blocks received over the network and stored in buffer 60. A partial block is counted as a full 64 B block. When a received packet fills one or more (possibly partial) blocks in buffer 60, receiver controller 62 increments received blocks counter 66 by the same number of blocks, e.g., using an 18-bit adder unit 70.

When the receiving node receives a 12-bit resolution version of sent blocks counter 44, an up converter 74 converts this 12-bit resolution count to an 18-bit resolution, e.g., by multiplying its input by 64 (similarly to up converter 56.) Receiver controller 62 then stores the 18-bit resolution result in received blocks counter 66. Thus, received blocks counter 66 keeps track of the value of sent blocks counter 44, so that the sending and receiving nodes remain synchronized even when some of the data packets are lost while being sent over link 32.

Receiver controller 62 publishes the number of available credits relative to the total number of delivered blocks, by adding the number of available blocks in buffer 60 to the content of received blocks counter 66. Receiver controller 62 converts the 18-bit resolution credit count value to 12-bit resolution using a down converter 78, and sends the 12-bit resolution credit count (via a suitable flow-control packet) to sending node 28. Down converter 78 can be implemented by extracting the 12 MSBs, similarly to down converter 52 described above.

In an embodiment, since a single credit count in 12-bit resolution indicates to the sending end that it may send any number between 64 and 4 K bytes, the receiving end buffer includes an extra space of 4 KB, in addition to the buffering space published to the sending end.

The configuration of computing system 20 in FIG. 1, and in particular the configurations of nodes 24 and 28, is an example configuration, which is chosen purely for the sake of conceptual clarity. In alternative embodiments, any other suitable system configuration or node can also be used. FIG. 1 shows a single port of each of the sending and receiving nodes. Real-life nodes, however, typically comprise multiple ports, and the circuitry shown in the figure is typically duplicated per port (or at least for each port that is designated to communicate over a long-haul link).

The different elements of receiving node 24 such as buffer 60 and receiver controller 62, and of sending node 28, such as, transmitter buffer 36 and transmitter controller 40, may be implemented using any suitable hardware, such as in an Application-Specific Integrated Circuit (ASIC) or Field-Programmable Gate Array (FPGA). In some embodiments, some elements of receiving node 24 and sending node 28 can be implemented using software, or using a combination of hardware and software elements.

In some embodiments, transmitter controller 40, receiver controller 62 or both comprise a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

In the example of FIG. 1, the receive buffer at the receiving node comprises 64 B blocks. Additionally, within the nodes, flow-control information is represented in 18-bit resolution and exchanged between the nodes using 12-bit resolution. In alternative embodiments, however, any other suitable block size other than 64 B, and resolutions other than 18 and 12 bits for the internal and communicated flow-control information can also be used.

Credit-Based Flow-Control Methods

Figure 2:
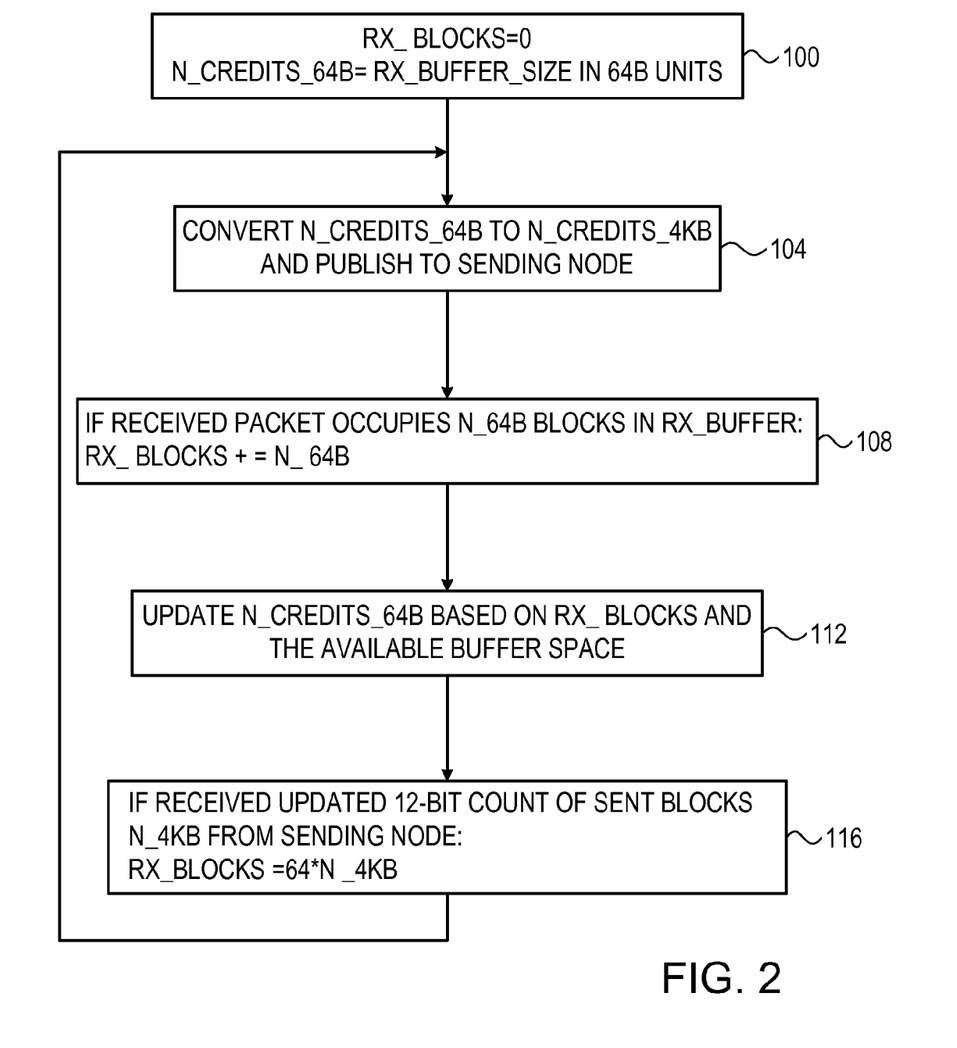
FIG. 2 is a flow chart that schematically illustrates a method for credit-based flow control management at the receiving node, in accordance with an embodiment of the present invention.

FIG. 2 is a flow chart that schematically illustrates a method for credit-based flow-control management at the receiving end, in accordance with an embodiment of the present invention. The method begins at an initialization step 100, in which receive buffer 60 is assumed empty and receiver controller 62 clears received blocks counter 66, and initializes the 18-bit resolution credit count to the size of buffer 60 in units of 64 B. For example, for a 128 KB buffer the initial 18-bit resolution credit count equals 2048.

In some embodiments, the receiver controller initializes the 18-bit resolution count according to a size that equals 4 KB less than the size of the receive buffer, since per a single 4 KB credit, the sending node may deliver between 64 B and 4 KB to the receiving node.

At a credit reporting step 104, receiver controller 62 converts the 18-bit resolution credit count to a 12-bit resolution using down converter 78. In an example embodiment, down converter 78 divides the 18-bit resolution credit count by 64 and rounds the result down. For example, an 18-bit resolution credit count of 2048 64 B units is converted to a 12-bit resolution credit count of 32 units of 4 KB.

When a packet arrives at receiving node 24, receiver controller 62 stores the packet bytes in buffer 60, and updates received blocks counter 66 accordingly. At a received blocks count updating step 108, assuming that the received packet occupies N_64 B blocks in buffer 60, the receiver controller increments the value of received blocks counter 66 by N_64 B. The receiver controller increments received blocks counter 66 using wrap around calculations to accommodate count values larger than the maximal value that can be represented by 18 bits.

At a credits updating step 112, the receiver controller adds the number of available 64 B blocks in buffer 60 to the received blocks count in counter 66 to produce the updated 18-bit resolution credit count N_CREDITS_64 B.

At a synchronization step 116, when receiving node 24 receives from sending node 28 a 12-bit resolution sent blocks count N_ACC_4 KB (derived from sent blocks counter 44), up converter 74 converts this count to an 18-bit representation by multiplying N_ACC_4 KB by 64, and the receiver controller stores the 18-bit result in received blocks counter 66. The method then loops back to step 104 to convert the credit count N_CREDITS_64 B from step 112 to a 12-bit representation for publishing the credit count to the sending node.

Figure 3:
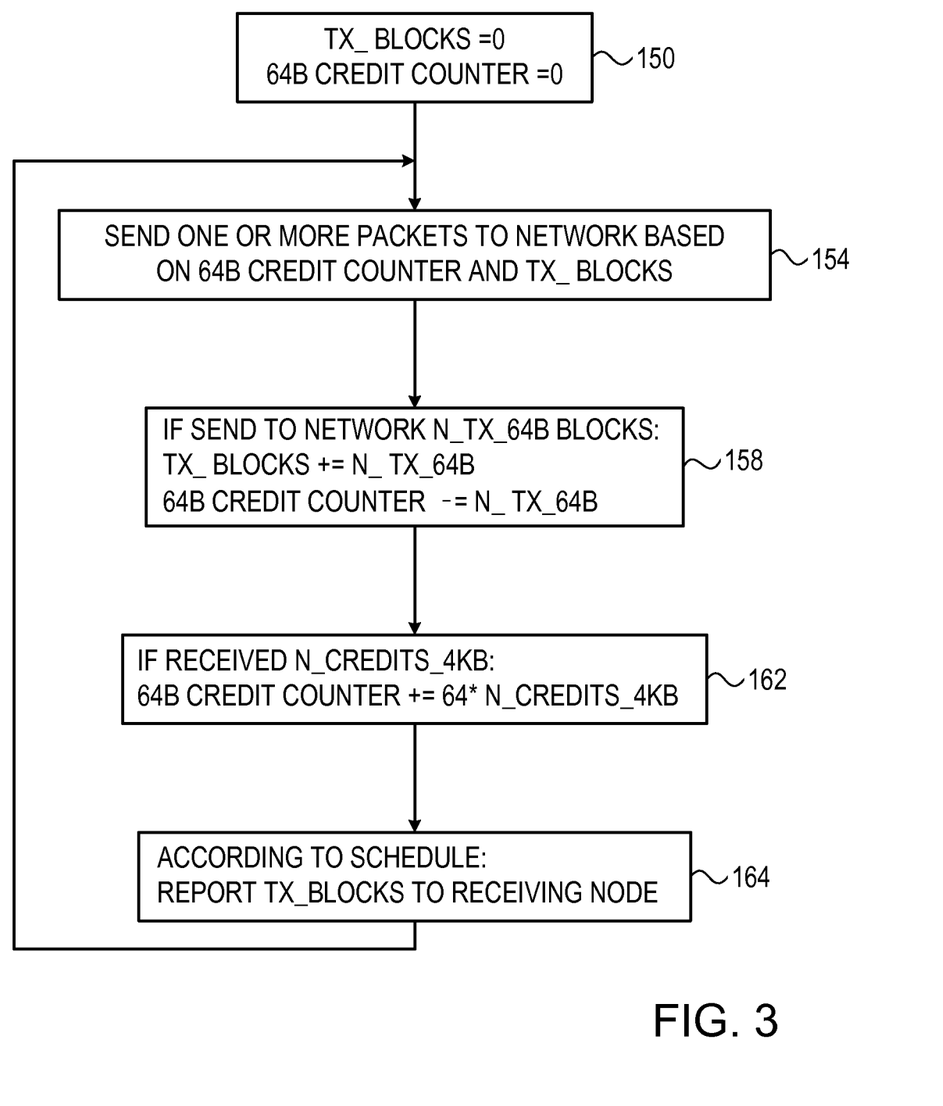
FIG. 3 is a flow chart that schematically illustrates a method for credit-based flow control management at the sending node, in accordance with an embodiment of the present invention.

FIG. 3 is a flow chart that schematically illustrates a method for credit-based flow-control management at the sending end, in accordance with an embodiment of the present invention. The method begins with transmitter controller 40 initializing both sent blocks counter 44 and credit counter 48 to zero, at a sender initialization step 150.

At a data sending step 154, the transmitter controller sends one or more data packets to the network, so that the number of bytes sent (NB) does not exceed 64 times the difference between the values held in credit counter 48 and sent blocks counter 44.

At a counters updating step 158, the transmitter controller derives the number of sent blocks N_TX_64 B by dividing NB by 64 and rounding the result up. The transmitter controller then increments sent blocks counter 44 by N_TX_64 B (using wrap around addition calculations), and decrements credit counter 48 by N_TX_64 B.

At a credit updating step 162, if the sending node received a flow-control packet carrying a 12-bit resolution credit count N_CREDITS_4 KB, transmitter controller 40 updates credit counter 48 by converting N_CREDITS_4 KB to 18 bits using up converter 56. In some embodiments, up converter 56 multiplies its 12-bit input by 64 to produce the 18-bit output. At a sender reporting step 164, the transmitter controller converts the value held in sent blocks counter 44 to 12-bit resolution using down converter 52, and sends the 12-bit resolution result to the receiving node via a suitable flow-control packet. The method then loops back to step 154 to send subsequent packets.

The example credit-based flow-control schemes described above are chosen purely for the sake of conceptual clarity. In alternative embodiments, any other suitable credit-based flow-control schemes for supporting long-haul links can also be used. For example, when a communication link supports multiple Virtual Lanes (VLs), credit-based flow control can be implemented separately per VL using the techniques described above.

Although the embodiments described herein mainly address credit-based flow-control in InfiniBand, the methods and systems described herein can also be used in any other suitable communication system that uses credit-based flow-control.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
    storing packets received from a sending node over a communication link in a receive buffer of a receiving node, wherein the receive buffer comprises one or more blocks having a first block size;
    deriving a first credit count corresponding to a number of available blocks in the receive buffer;
    converting the first credit count to a second credit count so as to represent an available space in the receive buffer in accordance with a second block size, which is different from the first block size, by extracting from the first credit count a number of Most Significant Bits (MSBs) that depends on a ratio between the second block size and the first block size, which equals an integer ratio; and
    controlling a transmission rate of the sending node by publishing the second credit count to the sending node over the communication link.

2. The method according to claim 1, wherein publishing the second credit count comprises publishing a number of bytes that is smaller than an actual size of the receive buffer by at least the second block size.

3. The method according to claim 1, and comprising rounding-up or rounding-down the extracted MSBs.

4. The method according to claim 1, and comprising maintaining in the sending node a credit count in accordance with the first block size, and updating the credit count based on the second credit count published by the receiving node and on a number of bytes delivered from the sending node over the communication link.

5. A method for communication, comprising:
    storing packets received from a sending node over a communication link in a receive buffer of a receiving node, wherein the receive buffer comprises one or more blocks having a first block size;
    deriving a first credit count corresponding to a number of available blocks in the receive buffer;
    converting the first credit count to a second credit count so as to represent an available space in the receive buffer in accordance with a second block size, which is different from the first block size;
    controlling a transmission rate of the sending node by publishing the second credit count to the sending node over the communication link; and
    maintaining in the sending node a sent blocks count indicating a number of blocks delivered to the communication link since link initialization, and reporting by the sending node to the receiving node the sent blocks count in units corresponding to the second block size.

6. A method for communication, comprising:
    storing packets received from a sending node over a communication link in a receive buffer of a receiving node, wherein the receive buffer comprises one or more blocks having a first block size;
    deriving a first credit count corresponding to a number of available blocks in the receive buffer, by evaluating the number of available blocks in the receive buffer excluding part of the available space whose size equals at least a second block size, which is different from the first block size;
    converting the first credit count to a second credit count so as to represent an available space in the receive buffer in accordance with the second block size; and
    controlling a transmission rate of the sending node by publishing the second credit count to the sending node over the communication link.

7. A communication apparatus, comprising:
    a receive buffer, which comprises one or more blocks having a first block size; and
    a receiver controller, which is configured to store packets received over a communication link in the receive buffer, to derive a first credit count corresponding to a number of available blocks in the receive buffer, to convert the first credit count to a second credit count so as to represent an available space in the receive buffer in accordance with a second block size, which is different from the first block size, by extracting from the first credit count a number of Most Significant Bits (MSBs) that depends on a ratio between the second block size and the first block size, which equals an integer ratio, and to control a transmission rate of the packets by publishing the second credit count over the communication link.

8. The apparatus according to claim 7, wherein the receiver controller is configured to publish the second credit count by publishing a number of bytes that is smaller than an actual size of the receive buffer by at least the second block size.

9. The apparatus according to claim 7, wherein the receiver controller is configured to round-up or round-down the extracted MSBs.

10. The apparatus according to claim 7, and comprising a sending node, which is configured to generate and transmit the packets over the communication link, to maintain a credit count in accordance with the first block size, and to update the credit count based on the published second credit count and on a number of bytes delivered from the sending node to the communication link.

11. A communication apparatus, comprising:
    a sending node, which is configured to generate and transmit packets over a communication link;
    a receive buffer, which comprises one or more blocks having a first block size; and
    a receiver controller, which is configured to store the packets received from the sending node over the communication link in the receive buffer, to derive a first credit count corresponding to a number of available blocks in the receive buffer, to convert the first credit count to a second credit count so as to represent an available space in the receive buffer in accordance with a second block size, which is different from the first block size, and to control a transmission rate of the packets by publishing the second credit count over the communication link, wherein the sending node is configured to maintain a sent blocks count indicating a number of blocks delivered to the communication link since link initialization, and to report the sent blocks count over the communication link in units corresponding to the second block size.

12. A communication apparatus, comprising:

a receive buffer, which comprises one or more blocks having a first block size; and a receiver controller, which is configured to store packets received over a communication link in the receive buffer, to derive a first credit count corresponding to a number of available blocks in the receive buffer, by evaluating the number of available blocks in the receive buffer excluding part of the available space whose size equals at least a second block size, which is different from the first block size, to convert the first credit count to a second credit count so as to represent an available space in the receive buffer in accordance with the second block size, and to control a transmission rate of the packets by publishing the second credit count over the communication link.

* * * * *